(12) United States Patent
Tewfik et al.

(10) Patent No.: US 7,489,665 B1
(45) Date of Patent: Feb. 10, 2009

(54) ENHANCED TIME RESOLUTION USING MULTIPLE RECEPTIONS

(75) Inventors: Ahmed H. Tewfik, Edina, MN (US); Ebrahim Saberinia, Las Vegas, NV (US)

(73) Assignee: Regents of the University of Minnesota, St. Paul, MN (US)

(*) Notice: Subject to any disclaimer, the term of this patent is extended or adjusted under 35 U.S.C. 154(b) by 446 days.

(21) Appl. No.: 10/977,513

(22) Filed: Oct. 29, 2004

Related U.S. Application Data

(60) Provisional application No. 60/515,784, filed on Oct. 29, 2003.

(51) Int. Cl.
*H04B 7/216* (2006.01)
*H04B 1/00* (2006.01)
(52) U.S. Cl. ............................ 370/335; 375/130
(58) Field of Classification Search ............ 370/335, 370/130
See application file for complete search history.

(56) References Cited

U.S. PATENT DOCUMENTS

| | | | |
|---|---|---|---|
| 4,116,103 A | 9/1978 | Deutsch | |
| 5,677,927 A | 10/1997 | Fullerton et al. | |
| 5,960,031 A | 9/1999 | Fullerton et al. | |
| 5,984,514 A * | 11/1999 | Greene et al. | 708/203 |
| 6,154,484 A * | 11/2000 | Lee et al. | 375/130 |
| 6,331,997 B1 | 12/2001 | Li | |
| 6,735,398 B1 | 5/2004 | Izadpanah et al. | |
| 6,888,887 B1 | 5/2005 | Shattil | |
| 2003/0014242 A1 * | 1/2003 | Ananthpadmanabhan et al. | 704/201 |
| 2004/0001534 A1 * | 1/2004 | Yang | 375/143 |
| 2004/0005016 A1 | 1/2004 | Tewfik | |
| 2004/0008759 A1 * | 1/2004 | Yang | 375/152 |
| 2004/0215450 A1 * | 10/2004 | Lin | 704/219 |
| 2005/0100102 A1 * | 5/2005 | Gazdzinski et al. | 375/242 |
| 2005/0228654 A1 * | 10/2005 | Prieto et al. | 704/220 |

OTHER PUBLICATIONS

"IEEE 802.15 WPAN High Bit Rate Alternative PHY Task Group 3a (TG3a)", http://web.archive.org/web/20030216045000/http://www.ieee802.org/15/pub/TG3a.html, (archived Feb. 16, 2003) ,2pgs.

"Project: IEEE P802.15 Working Group for Wireless Personal Area Networks (WPANs)", *doc: IEEE.802.15094/266r0*, http://grouper.ieee.org/groups/802/15/pub/2003/Jul03/,(Jul. 2003) 89 pgs.

Aziz, P. M., et al., "An Overview of Sigma-Delta Converters", *IEEE Signal Processing Magazine*, (Jan. 1996), 61-94.

(Continued)

*Primary Examiner*—Andrew Lee
(74) *Attorney, Agent, or Firm*—Schwegman, Lundberg & Woessner, P.A.

(57) ABSTRACT

Systems and methods provide for increasing time resolution in digital communication systems by properly processing several received signals transmitted in different bands or time slots. The received signals correspond to sub-signals that are obtained by performing a filter bank decomposition of a signal with high time resolution. The time resolution of the system is proportional to the inverse of the product of the number of sub-signals and their individual bandwidth. In the presence of additive white Gaussian noise, finer time resolution can be achieved by using the disclosed approach.

7 Claims, 7 Drawing Sheets

OTHER PUBLICATIONS

Batra, A., et al., "Multi-Band OFDM Physical Layer Proposal for IEEE 802.15 Task Group 3a", *IEEE P802.15-03/268r2*, http://ieee802.org/15/pub/Download.html, (Nov. 2003), 69 pgs.

Blahut, R. E., "Theory of Remote Surveillance Algorithms", *In: Radar and Sonar, Part I—The IMA Volumes in Mathematics and its Applications*, (1991), 1-65.

Caffery, J. J., et al., "Vehicle Location and Tracking for IVHS in CDMA Microcells", *5th IEEE International Symposium on Wireless Networks—Catching the Mobile Future*, vol. 4, (1994), 1227-1231.

De Mateo Garcia, J. C., et al., "Effects of Bandpass Sigma-Delta Modulation on OFDM Signals", *IEEE Transactions on Consumer Electronics*, 45(2), (May 1999), 318-326.

Foerster, J. R., "The Effects of Multipath Interference on the Performance of UWB Systems in an Indoor Wireless Channel", *53rd IEEE Vehicle Technology Conference (VTC 2001 Spring)*, vol. 2, (2001), 1176-1180.

Fontana, R. J., et al., "An Ultra Wideband Communications Link for Unmanned Vehicle Applications", *Association for Unmanned Vehicle Systems International (AUVSI '97)*, (Jun. 1997), 6 pgs.

Gerakoulis, D., et al., "An Interference Suppressing OFDM System for Ultra Wide Bandwidth Radio Channels", *Proceedings of the IEEE Conference on Ultra Wideband Systems and Technologies*, (2002), 259-264.

Gerakoulis, D., et al., "Link Performance of an Ultra Wide Bandwidth Wireless In-Home Network", *Proceedings of the Seventh International Symposium on Computers and Communications (ISCC '02)*, (2002), 699-704.

Golomb, S. W., "Two-Valued Sequences With Perfect Periodic Autocorrelation", *IEEE Transactions on Aerospace and Electronic Systems*, 28(2), (Apr. 1992), 383-386.

Gupta, R., et al., "Capacity of Ultra-Wideband OFDM", *57th IEEE Semiannual Vehicle Technology Conference (VTC 2003 Spring)*, vol. 2, (2003), 1420-1424.

Kay, S. M., "Fundamentals of Statistical Signal Processing: Estimation Theory", *PTR Prentice-Hall, Inc.*, Englewood Cliffs, NJ, (1993),6 pgs.

Proakis, J., "Table of Contents", *Digital Communications*, (4th Edition, McGraw-Hill),(Aug. 15, 2000),3 pgs.

Saberinia, E., et al., "All-Digital Receiver Structures for MC-UWB Systems", *Proceedings, IEEE 58th Vehicular Technology Conference (VTC 2003)*, vol. 1, (2003),289-293.

Saberinia, E., et al., "Generating UWB-OFDM Signal Using Sigma-Delta Modulator", *57th IEEE Semiannual Vehicular Conference (VTC 2003 Spring)*, vol. 2, (2003), 1425-1429.

Saberinia, E., et al., "N-Tone Sigma-Delta UWB-OFDM Transmitter and Receiver", *IEEE International Conference on Acoustics, Speech, and Signal Processing 2003 (ICASSP '03)*, vol. 4, (2003), IV-129-IV-132.

Saberinia, E., et al., "Pilot Assisted Multi-User UWB Communications", *57th IEEE Semiannual Vehicle Technical Conference (VTC 2003)*, (2003), 5 pgs.

Saberinia, E., et al., "Ranging in Mutli-Band Communications Systems", *IEEE 59th Vehicular Technology Conference (VTC 2004-Spring)*, (May 2004), 2248-2251.

Saberinia, E., et al., "Receiver Structures for Multi-Carrier UWB Systems", *Proceedings, Seventh International Symposium on Signal Processing and its Applications (ISSP 2003)*, (Jul. 2003), 313-316.

Saberinia, E., "Single and Multi-Carrier UWB Communications", *Proceedings, Seventh International Symposium on Signal Processing and Its Applications (ISSPA 2003)*, (Jul. 2003), 343-346.

Saberinia, E., et al., "Synchronous UWB-OFDM", *IEEE International Symposium on Advances in Wireless Communications 2002 (ISWC '02)*, (Sep. 2002), 41-42.

Saberinia, E., et al., "Waveform and Receiver Design for Synchronous UWB-OFDM", *Proceedings, 2nd IEEE International Symposium on Signal Processing and Information Technology (ISSPIT '02)*, (2002), 5 pgs.

Tewfik, A. H., et al., "High Bit Rate Ultra-Wideband OFDM", *Proceedings of the IEEE Global Telecommunications Conference 2002 (GLOBECOM '02)*, vol. 3, (Nov. 2002), 2260-2264.

Wang, Z., et al., "Wireless Multicarrier Communications—Where Fourier Meets Shannon", *IEEE Signal Processing Magazine*, 17(3), (May 2000),29-48.

Werb, J., et al., "Designing a Positioning System for Finding Things and People Indoors", *IEEE Spectrum*, 35(9), (Sep. 1998), 71-78.

Win, M. Z., et al., "Ultra-Wide Bandwidth Time-Hopping Spread-Spectrum Impulse Radio for Wireless Multiple-Access Communications", *IEEE Transactions on Communications*, 48(4), (2000), 679-691.

* cited by examiner

ENHANCED TIME RESOLUTION USING MULTIPLE RECEPTIONS

RELATED FILES

This application is related to U.S. patent application Ser. No. 10/191,769, entitled "HIGH BIT RATE ULTRA-WIDEBAND OFDM", filed on Jul. 8, 2002; U.S. patent application Ser. No. 10/912,515 entitled "RANGING IN MULTI-BAND COMMUNICATION SYSTEMS" filed on Aug. 4, 2004; and claims the benefit of U.S. Provisional Application No. 60/515,784, filed Oct. 24, 2003, all of which are hereby incorporated herein by reference for all purposes.

FIELD

The present invention relates generally to communications systems and more particularly to systems and methods for increasing time resolution in digital communication systems by processing several received signals transmitted in different bands or time slots.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2003, Regents of the University of Minnesota, All Rights Reserved.

BACKGROUND

Signals that provide high time resolution are often used in communication systems for different purposes e.g. timing, synchronization, ranging and location awareness. Ranging or location awareness is a desirable feature in wireless networks, with applications ranging from military to safety, emergency (E911) and robotics. Research on the topic initially focused on outdoor cellular systems. These results were then extended to wireless local and personal area networks. Ranging is equivalent to estimating the time of arrival of a known signal with a narrow correlation function.

The time resolution, and therefore the precision of range estimation in any system is typically directly proportional to its actual or synthetic bandwidth. Hence, system bandwidth puts a limit on the time resolution that can be achieved by transmitting a signal on that system. Many of the designs in previous systems assume a given bandwidth and design a signal to achieve the maximum possible time resolution equal to the inverse of the total bandwidth. Recently multi-band communication systems have been proposed for ultra wideband (UWB) transmission. For example one of the leading proposals for IEEE 802.15.3a named multi-band OFDM (MB-OFDM), is a multi-band system. In multi-band systems, the whole bandwidth is divided into several sub-bands. In each time interval, a signal is transmitted over only one of the sub-bands. The system then switches to another sub-band to send another signal. Therefore, in any time interval one can send a signal with a bandwidth equal to that of a single sub-band. This would appear to decrease the achievable time resolution by a multi-band system.

In view of the above, there is a need in the art for the present invention.

SUMMARY

The above-mentioned shortcomings, disadvantages and problems are addressed by the present invention, which will be understood by reading and studying the following specification.

One aspect of the systems and methods is designing a series of sub-signals each with bandwidth of a single sub-band and combining them at the receiver to achieve the time resolution proportional to the inverse of the whole band width not that of a single sub-band. The sub-signals may be generated by passing a pseudo random (PN) sequence through an analysis filter bank and combining the received signals using a synthesis filter bank.

A further aspect is that the systems and methods can be generalized to achieve finer time resolution in single-band systems as well. In this case the sub-signals are sent in the same band in different time slots and combined at the receiver assuming that channel remained static during the total transmission time. In the presence of noise, it may be more advantageous to allocate all available time or frequency slots to the sub-signals designed with the disclosed approach, rather than sending the same signal repeatedly or using a hybrid scheme to decrease the effect of noise on the estimated time delay.

Systems and methods provide for increasing time resolution in digital communication systems by properly processing several received signals transmitted in different bands or time slots. The received signals correspond to sub-signals that are obtained by performing a filter bank decomposition of a signal with high time resolution. The time resolution of the system is proportional to the inverse of the product of the number of sub-signals and their individual bandwidth. In the presence of additive white Gaussian noise, finer time resolution can be achieved by using the disclosed approach rather than repeatedly transmitting the same signal or using a hybrid scheme.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
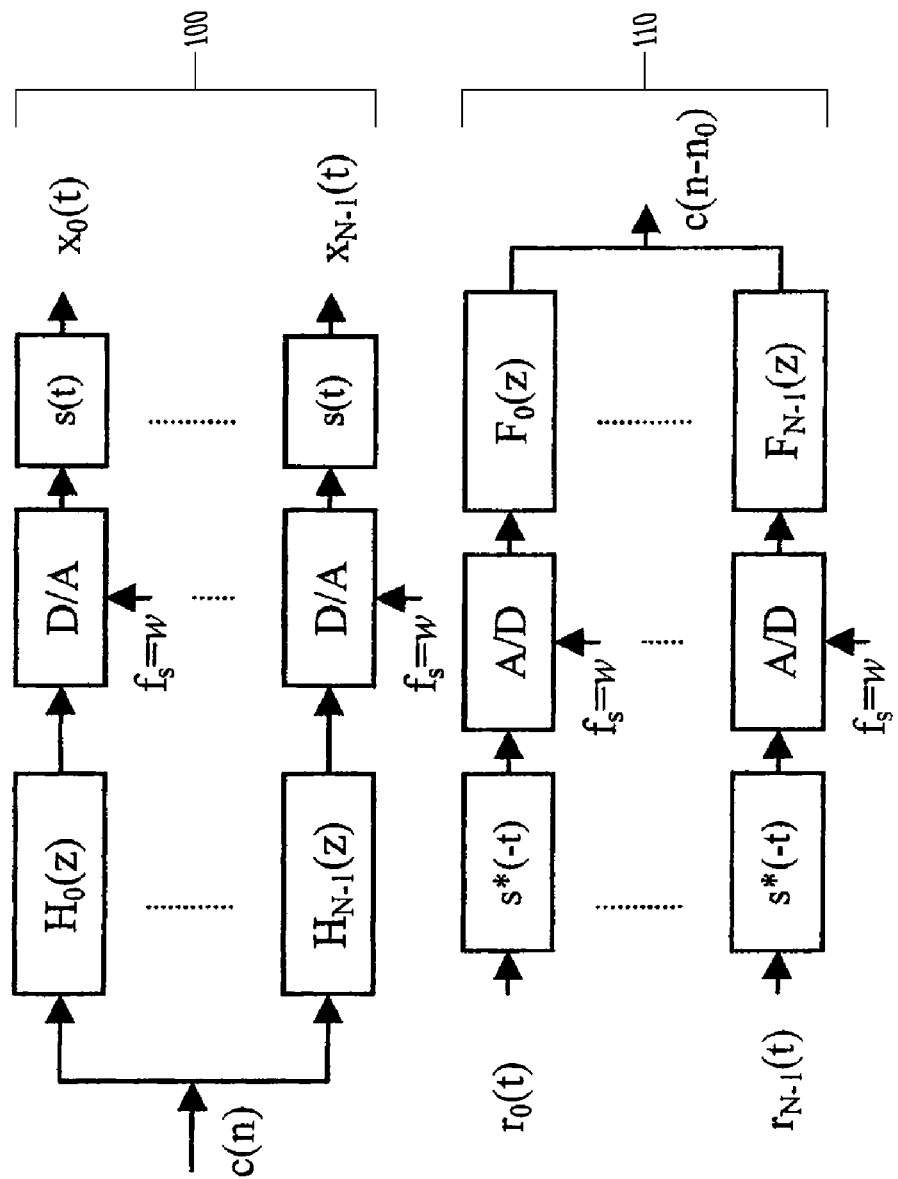
FIG. 1 illustrates a multi-band high time resolution signal transmitter and receiver implemented in passband according to embodiments of the invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

High Time Resolution Signal Design for Digital Communication Systems

A linear digital communication signal may be represented as:

$$x(t) = \sum_n c(n)s(t - nT_s) \tag{1}$$

where c(n) is a digital sequence and s(t) is a spectrum shaping pulse with duration $T_s$. The time resolution of this signal may be determined by the width of the main lobe of its autocorrelation function which may be written in terms of the autocorrelation function of the sequence c(n) as follows:

$$R_x(\tau) = \frac{1}{T} \sum_m R_c(m) R_g(\tau - mT). \tag{2}$$

Here $$R_s(\tau) = \int_{-\infty}^{+\infty} s(t - \tau) s*(t) \, dt$$

is the autocorrelation function of s(t) and $$R_c(m) = \sum_n c(n) c*(n - m)$$

the autocorrelation function of sequence c(n).

A fundamental limit on the time resolution of x(t) may be determined by the system bandwidth. Taking the Fourier transform of both sides of equation (2) implies:

$$X(f) = \frac{1}{T} |S(f)|^2 C(2\pi f T_s) \tag{3}$$

where S(f) is the Fourier transform of the pulse s(t) and C(ω) is the Fourier transform of the $R_c(m)$ defined as:

$$C(\omega) = \sum_m R_c(m) e^{-j\omega m}. \tag{4}$$

In the ideal case, the sequence c(n) is a random sequence with resolution of one sample i.e. its autocorrelation function is equal to $R_c(m)=\delta(m)$ and C(ω)=1 where δ(n) is a discrete time impulse function given by:

$$\delta(n) = \begin{cases} 1 & n = 0 \\ 0 & \text{else.} \end{cases} \tag{5}$$

In this case, the time resolution of the signal x(t) is equal to the pulse duration $T_s$ which is limited by the bandwidth of the system since:

$$X(f) = \frac{1}{T} |S(f)|^2. \tag{6}$$

Hence, the minimum time resolution in a system with bandwidth of w is equal to $T_s \approx 1/w$. A similar conclusion can be reached when additive white Gaussian noise (AWGN) is present.

In practice, a finite pseudo random (PN) sequence c(n) with length N may be used to generate a signal with high time resolution. These sequences have two level periodic autocorrelation function given by:

$$R_c(m) = \begin{cases} 1 & m = 0, \pm N, \pm 2N, \ldots \\ -1/N & \text{else} \end{cases} \quad (7)$$

If N is sufficiently large, then a delay in signal can be estimated with resolution $T_s$.

In summary, for a single-band system with bandwidth w a signal with time resolution equal to $T_s \approx 1/w$ may be designed by generating a signal like x(t) in equation (1) using PN sequences and a shaping pulse with duration $T_s$.

High Time Resolution Signal Design for a Multi-Band System

In a multi-band system the whole available bandwidth w may be divided into N sub-bands, each with a bandwidth of w/N. In a given time interval only a signal with bandwidth of w/N can be transmitted over one of the sub-bands. In order to rely on a single sub-band then one cannot achieve a time resolution better than N/w. To achieve better time resolution, some embodiments use a uniform full-tree wavelet filter bank decomposition to construct N sub-signals with a bandwidth of w/N that can be transmitted over the N sub-bands sequentially and combined at the receiver to provide time resolution equal to 1/w. Two different structures are described based on the transmitter and receiver implementation of the communication system. In some embodiments, the analysis filter bank generates an oversampled pass-band signal in the appropriate sub-band. In the first structure, some embodiments directly convert the pass-band oversampled signal to the analog domain. In the second structure according to various embodiments, the outputs of the filter bank are downsampled to generate a lowpass signal that can be converted to the analog domain at a lower rate and then modulated with a carrier for transmission in the appropriate sub-band. The structures with N=2 are derived below and then generalized to arbitrary N.

High Sampling Rate Pass-Band Implementation

Figure 2:
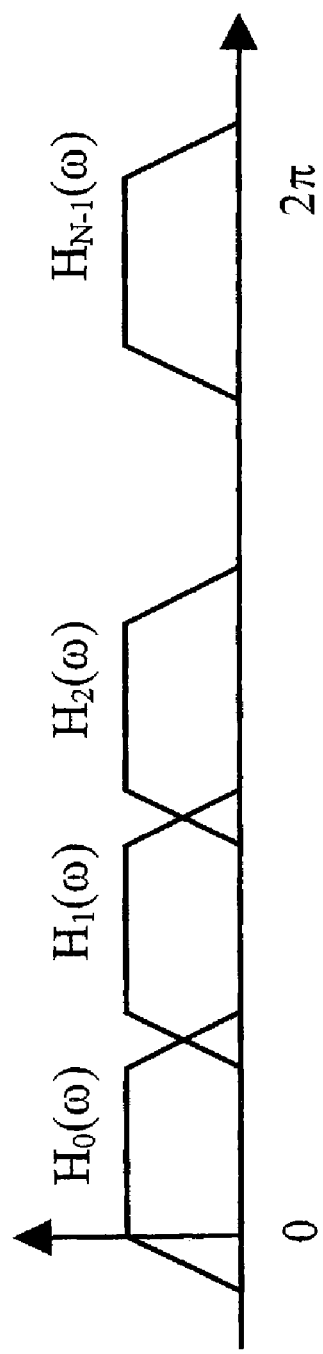
FIG. 2 illustrates frequency responses of an analysis filter bank according to embodiments of the invention.

A block diagram of a transmitter 100 and receiver 110 structure according to embodiments of the invention is shown in FIG. 1. A PN sequence c(n) is fed into a wavelet decomposition filter bank. The filter bank is a uniform DFT (Discrete Fourier Transform) bank which divides the spectrum $[0, 2\pi]$ to N equal sub-bands as depicted in FIG. 2. The ith output sub-sequence $c_i(n)$ contains the spectrum of the original PN sequence in the interval of $[2i\pi/N, 2(i+1)\pi/N]$. These sequences may be used to generate N sub-signals as:

$$x_i(t) = \sum_n c_i(n) s(t - nT_s) \quad (8)$$

where $T_s = 1/w$. According to (3), $x_i(t)$ has a spectrum essentially limited to the interval $[iw/N, (i+1)w/N]$ and may be sent in the ith sub-band of the multi-band system. At the receiver 110 of various embodiments, each sub-band signal may be sampled after matched filtering at a rate of w. The output sub-sequences then enter a synthesis filter bank to generate a delayed version of the original PN sequence. Since the PN sequence has a resolution equal to one time unit and the sampling rate is equal to w, the time resolution is equal to $T_s = 1/w$.

Figure 3A:
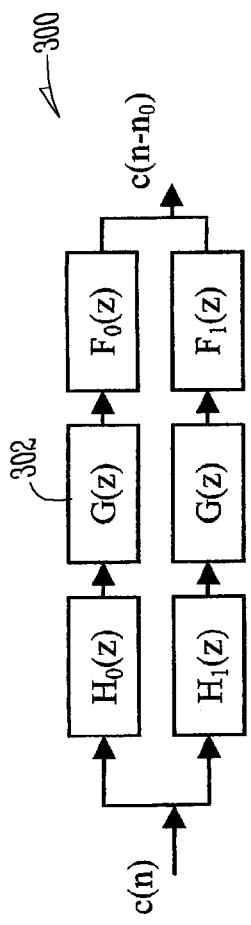
FIGS. 3A and 3B illustrate digital equivalent models of systems according to embodiments of the invention.
Figure 3B:
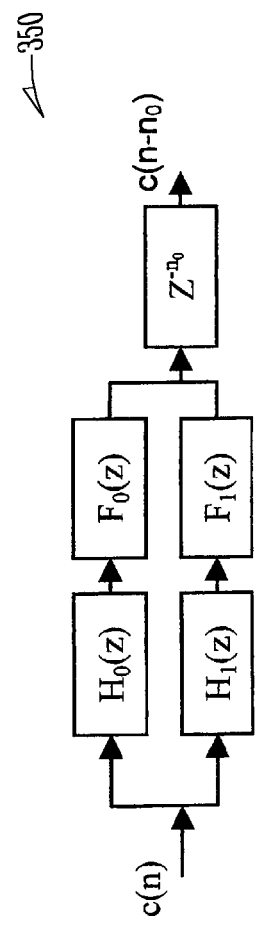

A digital equivalent model of the system 300 according to various embodiments is shown in FIG. 3A. The filter G(z) 302 represents a digital equivalent channel which contains the effects of the transmitter pulse shaping filter, the actual channel and the receiver front end filters. In other word the impulse response of the equivalent channel is equal to $$g(n) = [s(t) \hat{\times} h(t) \hat{\times} s^*(-t)]_{t=n/w} \quad (9)$$

where $\hat{\times}$ shows convolution operation. Some embodiments assume that the shaping pulse is a Nyquist pulse or that the channel is equalized such that the equivalent digital channel can be modeled as pure time delay as $G(z) = z^{-n_0}$. Further details may be found in U.S. patent application Ser. No. 10/912,515 entitled "RANGING IN MULTI-BAND COMMUNICATION SYSTEMS" which as been previously incorporated by reference. An equivalent structure 350 can be obtained by manipulation and is shown in FIG. 3B. According to this figure some embodiments use a perfect reconstruction filter bank (PRFB) $H_0(z), H_1(z), F_0(z), F_1(z)$ that:

$$H_0(z)F_0(z) + H_1(z)F_1(z) = 1. \quad (10)$$

According to some embodiments, both the digital to analog (D/A) at the transmitter and analog to digital converter (A/D) at the receiver operate at the oversampled rate of w in this structure. Operating the D/A and A/D at the base-band rate of w/N is desirable because it saves power and computational complexity. In the next sub-section some embodiments comprise a modified system to fit communication systems implementations that use the lower sampling rate.

Base-Band Implementation

Figure 4A:
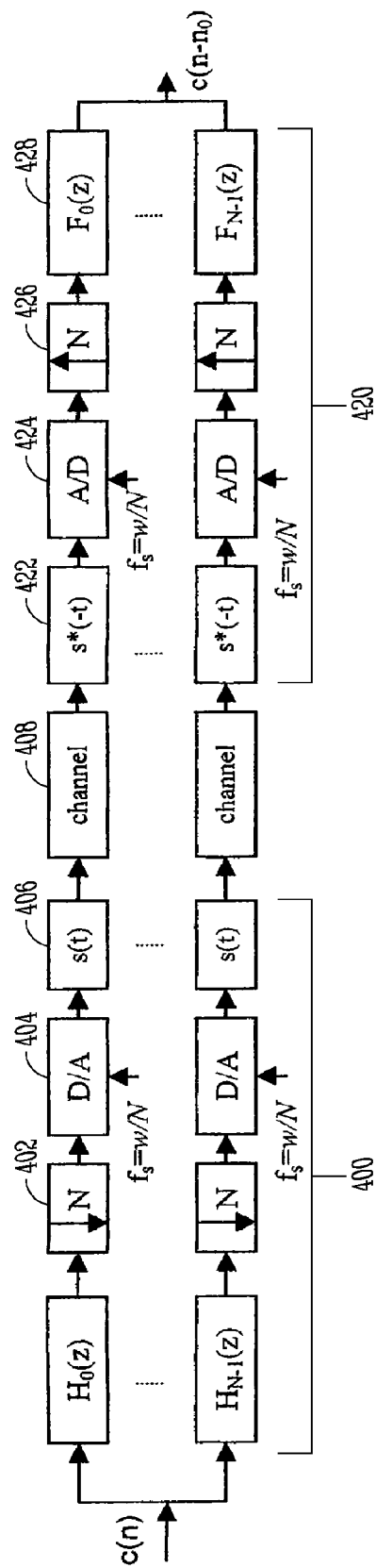
FIGS. 4A-4C illustrate a multi-band high time resolution signal transmitter and receiver implemented in base-band according to embodiments of the invention.
Figure 4B:
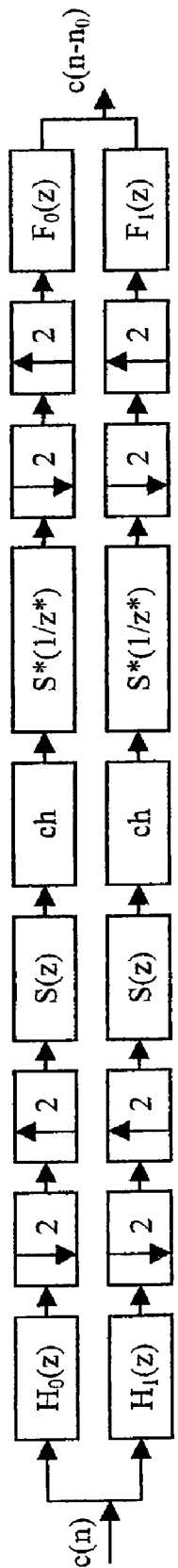
Figure 4C:
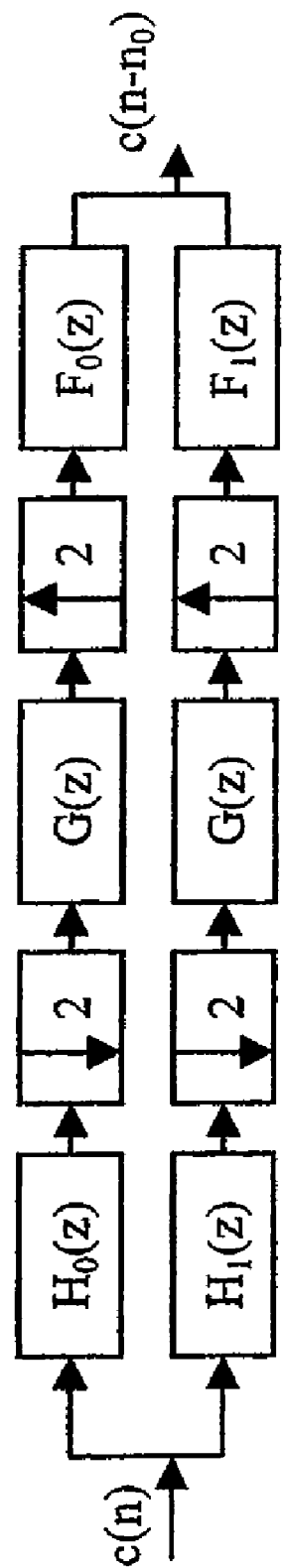

FIG. 4A illustrate a multi-band high time resolution signal transmitter 400 and receiver 420 implemented in base-band according to embodiments of the invention Since the outputs of the analysis filter bank are oversampled by a factor of N, some embodiments down sample 402 them to generate N sequences at a lower rate that can be fed to the D/A converter 404 with rate w/N as shown in FIG. 4A. It should be noted that the pulse shaping filter in this case has duration $T_s = N/w$. The signal then is upconverted 406 and transmitted in the appropriate sub-band 408. At the receiver, the signal is downconverted 422 and put though a matched filter and sampled at a rate w/N. To reconstruct the original signal some embodiments feed the sub-signals to a synthesis filter bank 428 as shown in FIG. 4A. The digital equivalent system is presented in FIG. 4B for N=2. Notice that this is equivalent to the structure shown in FIG. 4C and is a Quadrate Mirror Filter (QMF) bank. Perfect reconstruction is possible with:

$$H_1(z) = H_0(-z), F_0(z) = H_0(z), F_1(z) = -H_0(-z) \quad (11)$$

Generalization for Single and Multi-Band Systems

The approach described above can be generalized to achieve better time resolution in both single and multi-band systems. Assuming that one or multiple bands with bandwidth w are available, some embodiments transmit the M sub-signals generated by the analysis filter bank in different time slots with possible band reuse. With this technique some embodiments may achieve a resolution of 1/Mw even with a single band. An assumption utilized in some embodiments is that the channel remains static during the transmission of all sub-signals.

Effect of Noise

Suppose now that there are M time or frequency slots that can be used to either transmit M signals designed as described above, repeat a single signal of bandwidth w or use a hybrid scheme. If a signal is repeatedly sent, the corresponding received waveforms are averaged prior to delay estimation. Now note that that the variance of the estimation error in presence of AWGN with density $N_0/2$ is given by $\text{var}(\hat{\tau}) \gtrsim 1/[(E_s/2N_0) \cdot \bar{F}^2]$ where $E_s$ is the energy of the shaping pulse and $\bar{F}$ is its mean square bandwidth. If a signal is sent with equivalent bandwidth of w and average M received waveforms, the variance of the estimation error will be equal to:

$$\text{var}(\hat{\tau}_{ave}) = \text{var}(\hat{\tau})/M \approx 1/[(E_s/2N_0)\cdot{}^2 w^2 M] \tag{12}$$

On the other hand if M time slots are used to transmit a signal with equivalent bandwidth of Mw the estimation error is equal to:

$$\text{var}(\hat{\tau}_M) \approx 1/[(E_s/2N_0)\cdot{}^2 (Mw)^2] = \text{var}(\hat{\tau}_{ave})/M. \tag{13}$$

This equation shows that using properly designed sub-signals may be better than transmitting the same signal and averaging over individual returns.

Figure 5:
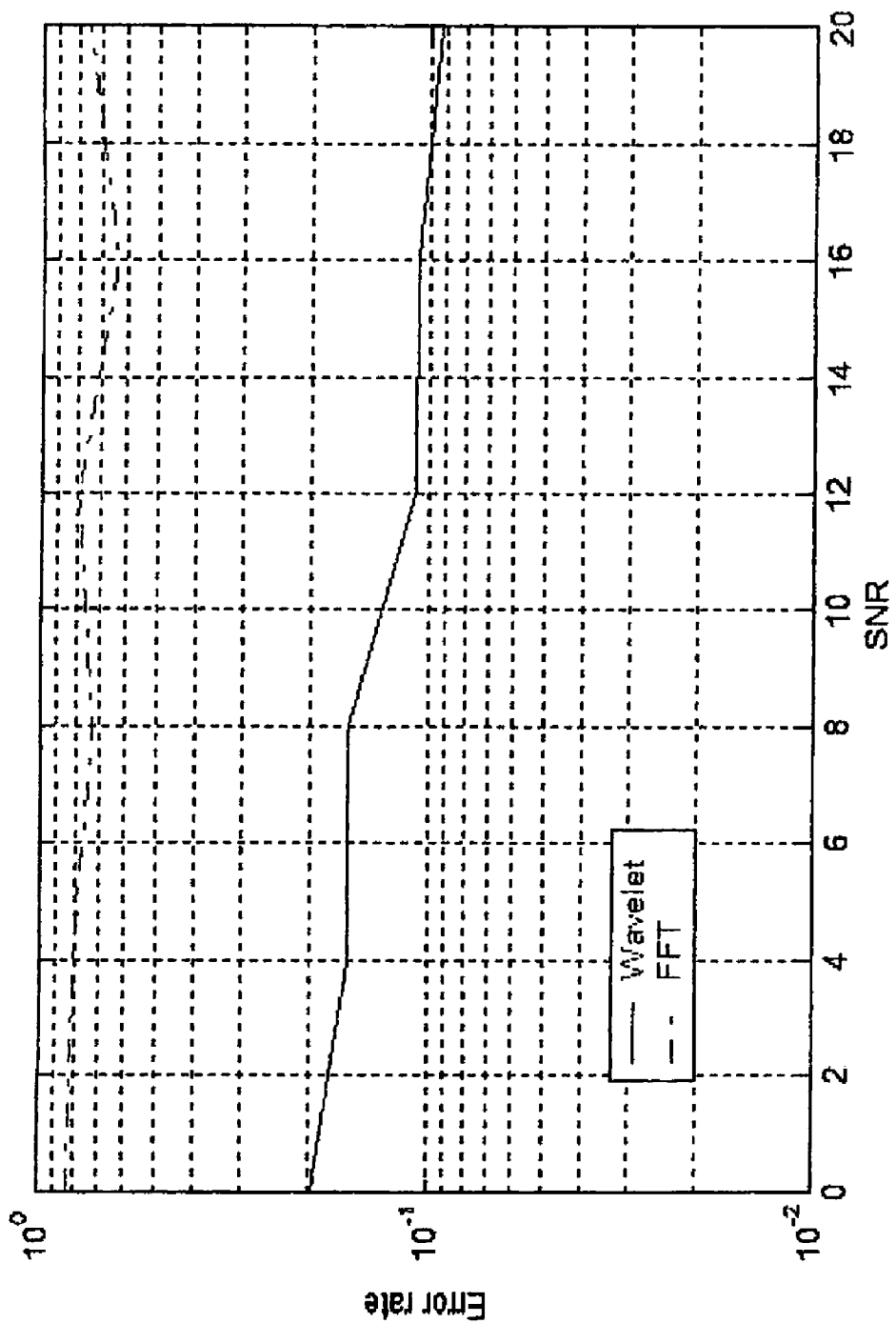
FIG. 5 is a graph illustrating a delay estimation error rate for FFT and wavelet methods with random phase mismatch for particular embodiments of the invention.

In FIG. 5 the error rate of a representative embodiment is plotted versus signal to noise ratio (SNR) assuming a random phase in each transition. The simulation shows that the systems and methods according to some embodiments are more robust to the phase errors than the FFT method.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description.

What is claimed is:

1. A digital communications system comprising:
    a wavelet decomposition filter bank; and
    a signal generator operable to generate a plurality of sub-signals by passing a pseudo random (PN) sequence through the wavelet decomposition filter bank;
    wherein the wavelet decomposition filter bank divides the spectrum such that a portion of the PN sequence having an index of i contains a spectrum of the original PN sequence corresponding to the interval of $[2i\pi/N, 2(i+1)\pi/N]$ where N is the number of sub-bands.

2. The system of claim 1, wherein the sub-signals are sent in the same band in different time slots and combined at the signal receiver using a single static channel.

3. The system of claim 1, wherein the wavelet decomposition filter bank includes a DFT bank.

4. A system comprising:
    a signal generator operable to generate a plurality of sub-signals by passing a pseudo random (PN) sequence through wavelet decomposition filter bank; and
    a signal receiver operable to combine the received sub-signals using a synthesis filter bank;
    wherein the wavelet decomposition filter bank divides the spectrum such that a portion of the PN sequence having an index of i contains a spectrum of the original PN sequence corresponding to the interval of $[2i\pi/N, 2(i+1)\pi/N]$ where N is the number of sub-bands.

5. The system of claim 4, wherein the plurality of sub-signals are generated according to the formula $$x_i(t) = \sum_n c_i(n) s(t - nT_s)$$

where $x_i$ comprises a sub-signal, $c_i$ comprises a portion of the PN sequence in the sub-signal and s is a spectrum shaping pulse with duration $T_s$ and wherein the sub-signal is sent in a corresponding sub-band.

6. The system of claim 5, wherein $T_s$ is determined as $1/w$ where w is the available bandwidth.

7. The system of claim 5, wherein each sub-band signal is sampled after matched filtering at a rate of w.

* * * * *